(12) United States Patent
Shin et al.

(10) Patent No.: US 9,781,372 B2
(45) Date of Patent: Oct. 3, 2017

(54) DRIVER AND IMAGE SENSING DEVICE INCLUDING THE SAME

(71) Applicant: SK hynix Inc., Gyeonggi-do (KR)

(72) Inventors: Min-Seok Shin, Gyeonggi-do (KR); Young-Chul Sohn, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 446 days.

(21) Appl. No.: 14/497,026

(22) Filed: Sep. 25, 2014

(65) Prior Publication Data

US 2015/0244954 A1   Aug. 27, 2015

(30) Foreign Application Priority Data

Feb. 27, 2014   (KR) .......................... 10-2014-0023197

(51) Int. Cl.
*H03K 3/00*   (2006.01)
*H04N 5/376*   (2011.01)
*H04N 5/365*   (2011.01)

(52) U.S. Cl.
CPC ........... *H04N 5/376* (2013.01); *H04N 5/3658* (2013.01)

(58) Field of Classification Search
None
See application file for complete search history.

(56) References Cited

U.S. PATENT DOCUMENTS

| 5,248,906 A * | 9/1993 | Mahmood ............ H03K 17/163 326/27 |
| 5,406,147 A * | 4/1995 | Coyle ................. G06F 13/4072 326/17 |
| 2013/0342259 A1* | 12/2013 | Teraguchi ............. H03K 3/012 327/333 |

FOREIGN PATENT DOCUMENTS

| KR | 1020070013509 | 1/2007 |
| KR | 1020090055771 | 6/2009 |

* cited by examiner

*Primary Examiner* — Long Nguyen
(74) *Attorney, Agent, or Firm* — IP & T Group LLP

(57) ABSTRACT

A driver includes a first level shifting unit generating a second signal swinging in a second threshold range in response to a first signal swinging in a first threshold range, a second level shifting unit generating a third signal swinging in a third threshold range in response to the second signal, a first pull-up driving unit driving an output terminal with a first high-voltage in response to the second signal, a first pull-down driving unit driving the output terminal with a first low voltage in response to the third signal, a second pull-down driving unit driving the output terminal with a second low voltage higher than the first low voltage in response to the fourth signal, and a first path coupling unit coupling the second pull-down driving unit with the output terminal in response to the second signal.

14 Claims, 4 Drawing Sheets

DRIVER AND IMAGE SENSING DEVICE INCLUDING THE SAME

CROSS-REFERENCE TO RELATED APPLICATIONS

The present application claims priority of Korean Patent Application No. 10-2014-0023197, filed on Feb. 27, 2014, which is incorporated herein by reference in its entirety.

BACKGROUND

1. Field

Exemplary embodiments of the present invention relate to a semiconductor design technology, and more particularly, to a driver for driving pixels and an image sensing device including the driver.

2. Description of the Related Art

In general, image sensing devices capture images by using a semiconductor which is sensitive to the light. Image sensing devices may be divided into those that use Charge Coupled Device (CCD) technology and those that use Complementary Metal Oxide Semiconductor (CMOS) technology. Image sensing devices with CMOS technology are being widely used because it allows an analog circuit and a digital control circuit to be directly realized on a single integrated circuit (IC).

SUMMARY

Exemplary embodiments of the present invention are directed to a driver using two or more driving voltages depending on a transition section of a signal to be driven, and an image sensing device including the driver.

In accordance with an embodiment of the present invention, a driver includes a first level shifting unit suitable for generating a second signal which swings in a second threshold range in response to a first signal which swings in a first threshold range, a second level shifting unit suitable for generating a third signal which swings in a third threshold range in response to the second signal, and a driving unit suitable for generating a fourth signal swinging in a fourth threshold range and outputted through an output terminal in response to the second and third signals, wherein the driving unit including a first pull-up driving unit suitable for driving the output terminal with a first high-voltage in response to the second signal, a first pull-down driving unit suitable for driving the output terminal with a first low voltage in response to the third signal, a second pull-down driving unit suitable for driving the output terminal with a second low voltage which is higher than the first low voltage in response to the fourth signal and a first path coupling unit suitable for coupling the second pull-down driving unit with the output terminal in response to the second signal. The threshold voltage of the second pull-down driving unit may be lower than a threshold voltage of the first pull-down driving unit.

In accordance with an embodiment of the present invention, a driver includes a first level shifting unit suitable for generating a second signal which swings in a second threshold range in response to a first signal which swings in a first threshold range, a second level shifting unit suitable for generating a third signal which swings in a third threshold range in response to the second signal, and a driving unit suitable for generating a fourth signal swinging in a fourth threshold range and outputted through an output terminal in response to the second and third signals, wherein the driving unit including a first pull-up driving unit suitable for driving an output terminal with a first high-voltage in response to the second signal, a pull-down driving unit suitable for driving the output terminal with a first low voltage in response to the third signal, a second pull-up driving unit suitable for driving the output terminal with a second high voltage which is lower than the first high voltage in response to the fourth signal, and a path coupling unit suitable for coupling the second pull-up driving unit with the output terminal in response to the third signal. The threshold voltage of the second pull-up driving unit may be lower than a threshold voltage of the first pull-up driving unit.

In accordance with an embodiment of the present invention, an image sensing device includes a driver suitable for generating a second signal by changing a level of a first signal, wherein the driver generates the second signal based on a first voltage during a first section of a first transition section where the first signal shifts from a first logic level to a second logic level and based on a second voltage which is different from the first voltage during a second section of the first transition section; and a pixel array suitable for generating a pixel signal in response to the second signal.

In accordance with an embodiment of the present invention, a driver includes a first pull-up driving unit suitable for generating a second signal by driving an output terminal with a first high voltage during a first transition section where a first signal shifts from a first logic level to a second logic level, a first pull-down driving unit suitable for generating the second signal by driving the output terminal with a first low voltage during a second transition section where the first signal shifts from the second logic level to the first logic level, a second pull-up driving unit suitable for driving the output terminal with a second high voltage which is lower than the first high voltage during a first section of the first transition section, a second pull-down driving unit suitable for driving the output terminal with a second low voltage which is higher than the first low voltage during a first section of the second transition section, a first path coupling unit suitable for coupling the second pull-up driving unit with the output terminal in response to the first signal, and a second path coupling unit suitable for coupling the second pull-down driving unit with the output terminal in response to the first signal.

DETAILED DESCRIPTION

Hereafter, exemplary embodiments of the present invention will be described in more detail with reference to the accompanying drawings. These embodiments are provided so that this disclosure will be thorough and complete, and will fully convey the scope of the present invention to those skilled in the art.

Figure 1:
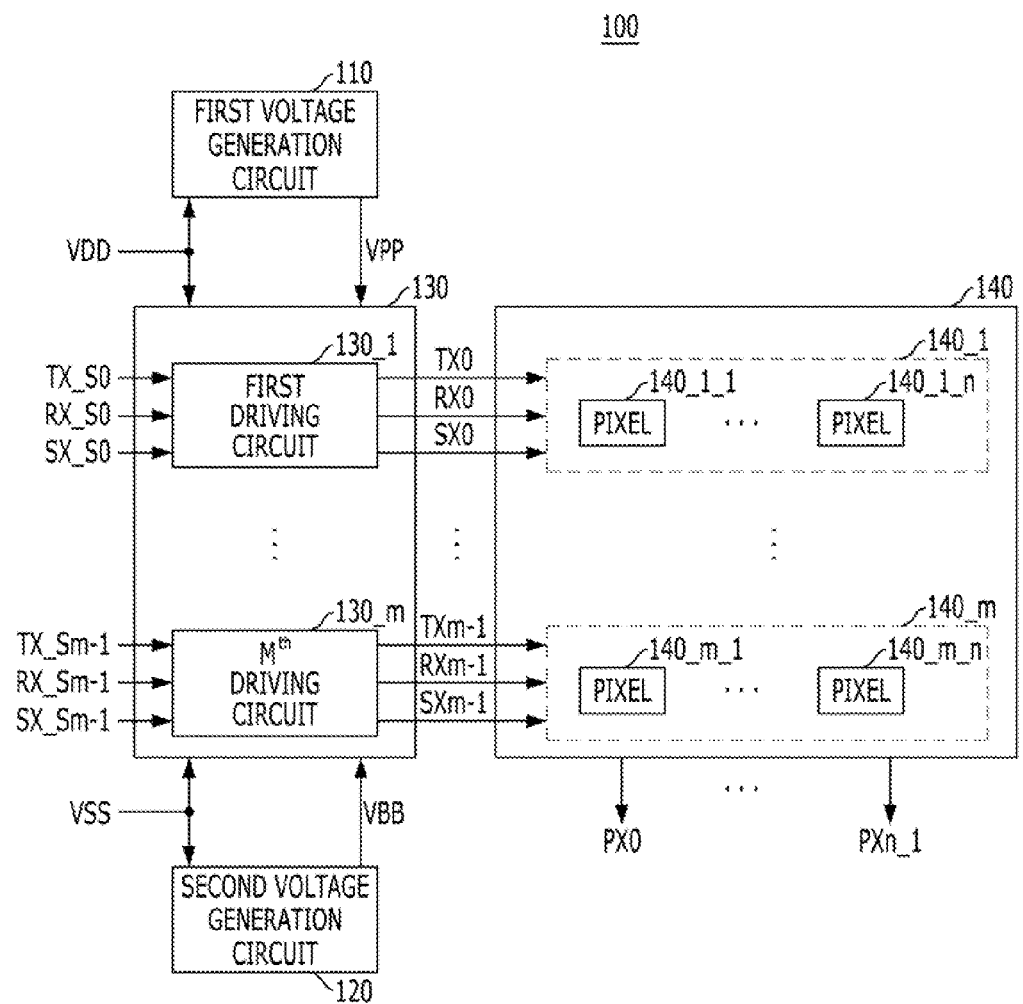
FIG. 1 is a block diagram illustrating an image sensing device in accordance with an embodiment of the present invention.

FIG. 1 is a block diagram illustrating an image sensing device in accordance with an embodiment of the present invention.

Referring to FIG. 1, an image sensing device 100 may include a first voltage generation circuit 110, a second voltage generation circuit 120, a row control block 130, and a pixel array 140. The first voltage generation circuit 110 generates a boosted voltage VPP based on a power supply voltage VDD. The second voltage generation circuit 120 generates a reduced (or negative) voltage VBB based on a ground voltage VSS. The row control block 130 receives the power supply voltage VDD, the boosted voltage VPP, the ground voltage VSS and the reduced voltage VBB, and generates first to $m^{th}$ transmission signals TX0 to TXm−1, first to $m^{th}$ reset signals RX0 to RXm−1 and first to $m^{th}$ selection signals SX0 to SXm−1 in response to first to $m^{th}$ transmission source signals TX_S0 to TX_Sm−1, first to $m^{th}$ reset source signals RX_S0 to RX_Sm−1 and first to $m^{th}$ selection source signals SX_S0 to SX_Sm−1. The pixel array 140 outputs first to $n^{th}$ pixel signals PX0 to PXn−1 in response to the first to $m^{th}$ transmission signals TX0 to TXm−1, the first to $m^{th}$ reset signals RX0 to RXm−1 and the first to $m^{th}$ selection signals SX0 to SXm−1.

The first voltage generation circuit 110 may generate a boosted voltage VPP, which is higher than a power supply voltage VDD. For example, the first voltage generation circuit 110 may include a positive DC-to-DC converter.

The second voltage generation circuit 120 may generate a reduced voltage VBB, which is lower than a ground voltage VSS. For example, the second voltage generation circuit 120 may include a negative DC-to-DC converter.

The row control block 130 may include first to $m^{th}$ driving circuits 130_1 to 130_m corresponding to first to $m^{th}$ rows 140_1 to 140_m of the pixel array 140. The first to $m^{th}$ driving circuits 130_1 to 130_m output the first to $m^{th}$ transmission signals TX0 to TXm−1, the first to $m^{th}$ reset signals RX0 to RXm−1 and the first to $m^{th}$ selection signals SX0 to SXm−1, which swing in a second threshold range, by converting levels of the first to $m^{th}$ transmission source signals TX_S0 to TX_Sm−1, the first to $m^{th}$ reset source signals RX_S0 to RX_Sm−1 and the first to $m^{th}$ selection source signals SX_S0 to SX_Sm−1 which swing in a first threshold range. For example, the first threshold range may include a range between a ground voltage VSS and a power supply voltage VDD, and the second threshold range may include a range between a reduced voltage VBB and a boosted voltage VPP.

Since the first to $m^{th}$ driving circuits 130_1 to 130_m have the same structure, the first driving circuit 130_1 is described below representatively.

Figure 2:
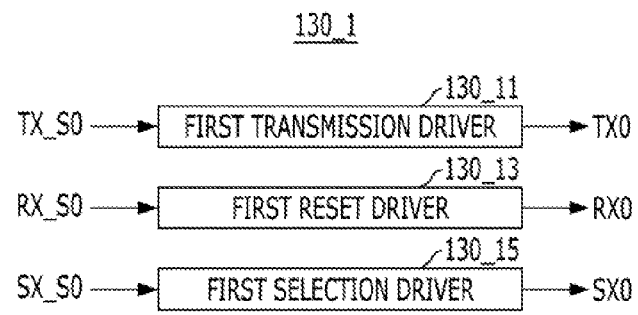
FIG. 2 illustrates an internal structure of a first driving circuit shown in FIG. 1.

FIG. 2 illustrates an internal structure of the first driving circuit 130_1 shown in FIG. 1.

Referring to FIG. 2, the first driving circuit 130_1 may include a first transmission driver 130_11 for generating a first transmission signal TX0 in response to a first transmission source signal TX_S0, a first reset driver 130_13 for generating a first reset signal RX0 in response to a first reset source signal RX_S0 and a first selection driver 130_15 for generating a first selection signal SX0 in response to a first selection source signal SX_S0. The first transmission driver 130_11, the first reset driver 130_13 and the first selection driver 130_15 may have different structures or the same structure. In the embodiment of the present invention, as an example, the first transmission driver 130_11, the first reset driver 130_13 and the first selection driver 130_15 have the same structure, and the first transmission driver 130_11 is described below representatively.

Figure 3:
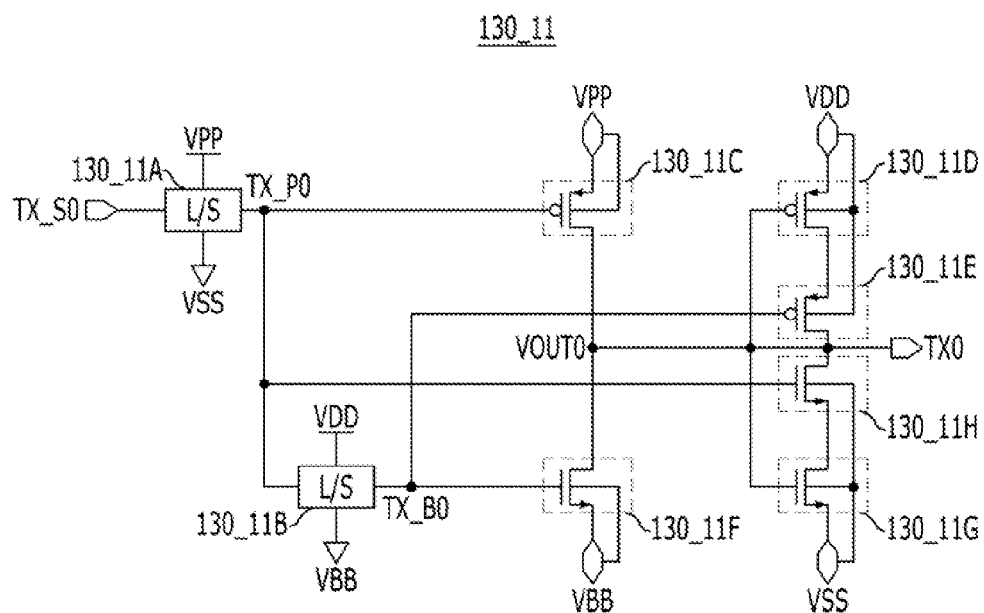
FIG. 3 illustrates an example of an internal structure of a first transmission driver shown in FIG. 2.

FIG. 3 illustrates an example of the internal structure of the first transmission driver 130_11 shown in FIG. 2.

The first transmission driver 130_11 may include a first level shifting unit 130_11A, a second level shifting unit 130_11B, a first pull-up driving unit 130_11C, a second pull-up driving unit 130_11D, a first path coupling unit 130_11E, a first pull-down driving unit 130_11F, a second pull-down driving unit 130_11G, and a second path coupling unit 130_11H. The first level shifting unit 130_11A generates a first transmission pull-up signal TX_P0 which swings between a ground voltage VSS and a boosted voltage VPP in response to the first transmission source signal TX_S0 which swings between the ground voltage VSS and a power supply voltage VDD. The second level shifting unit 130_11B generates a first transmission pull-down signal TX_B0 which swings between a reduced voltage VBB and the power supply voltage VDD in response to the first transmission pull-up signal TX_P0. The first pull-up driving unit 130_11C drives an output terminal VOUT0 of the first transmission signal TX0 with the boosted voltage VPP in response to the first transmission pull-up signal TX_P0. The second pull-up driving unit 130_11D drives the output terminal VOUT0 with the power supply voltage VDD in response to the first transmission signal TX0. The first path coupling unit 130_11E is coupled between the second pull-up driving unit 130_11D and the output terminal VOUT0 and selectively couples the second pull-up driving unit 130_11D with the output terminal VOUT0 in response to the first transmission pull-down signal TX_B0. The first pull-down driving unit 130_11F drives the output terminal VOUT0 with the reduced voltage VB in response to the first transmission pull-down signal TX_B0. The second pull-down driving unit 130_11G drives the output terminal VOUT0 with the ground voltage VSS in response to the first transmission signal TX0. The second path coupling unit 130_11H is coupled between the second pull-down driving unit 130_11G and the output terminal VOUT0 and selectively couples the second pull-down driving unit 130_11G with the output terminal VOUT0 in response to the first transmission pull-up signal TX_P0.

Since the first and second level shifting units 130_11A and 130_11B are widely known to those skilled in the art, detailed descriptions thereon will omitted.

The first pull-up driving unit 130_11C and the first pull-down driving unit 130_11F may supply the predetermined voltages VPP and VBB to the output terminal VOUT0 during a transition section of the first transmission signal TX0 as main driving units of the first transmission driver 130_11. The first pull-up driving unit 130_11C may include a PMOS transistor where the first transmission pull-up signal TX_P0 is inputted to its gate, and its source and drain are coupled between a boosted voltage VPP terminal and the output terminal VOUT0. The first pull-down driving unit 130_11F may include an NMOS transistor where the first transmission pull-down signal TX_B0 is inputted to its gate, and its source and drain are coupled between a reduced voltage VBB terminal and the output terminal VOUT0.

The second pull-up driving unit 130_11D and the second pull-down driving unit 130_11G supplies the predetermined voltages VDD and VSS to the output terminal VOUT0 during a first section of the transition section of the first transmission signal TX0 as pre-driving units of the first transmission driver 130_11. The second pull-up driving unit 130_11D may include a PMOS transistor where the first transmission signal TX0 is inputted to its gate, and its source and drain are coupled between a power supply voltage VDD terminal and the output terminal VOUT0. The second pull-down driving unit 130_11G may include an NMOS transistor where the first transmission signal TX0 is inputted to its gate, and its source and drain are coupled between a ground voltage VSS terminal and the output terminal VOUT0.

As described above, the second pull-up driving unit 130_11D and the second pull-down driving unit 130_11G may drive the output terminal VOUT0 during the first section of the transition section of the first transmission signal TX0 while the first pull-up driving unit 130_11C and the first pull-down driving unit 130_11F drive the output terminal VOUT0 during the transition section of the first transmission signal TX0. In other words, the first pull-up driving unit 130_11C and the second pull-up driving unit 130_11D, or the first pull-down driving unit 130_11F and the second pull-down driving unit 130_11G are turned on during the first section of the transition section, and the first pull-up driving unit 130_11C or the first pull-down driving unit 130_11F is turned on during a second section of the transition section. Consequently, as the first pull-up driving unit 130_11C and the second pull-up driving unit 130_11D, or the first pull-down driving unit 130_11F and the second pull-down driving unit 130_11G drive the output terminal VOUT0 simultaneously during the first section of the transition section, the ripple occurring in the levels of the boosted voltage VPP and the reduced voltage VBB, which are driving voltages, may decrease.

When the threshold voltage of the second pull-up driving unit 130_11D is designed to be lower than the threshold voltage of the first pull-up driving unit 130_11C, the driving capability of the second pull-up driving unit 130_11D becomes better than the driving capability of the first pull-up driving unit 130_11C. Also, when the threshold voltage of the second pull-down driving unit 130_11G is designed to be lower than the threshold voltage of the first pull-down driving unit 130_11F, the driving capability of the second pull-down driving unit 130_11G becomes better than the driving capability of the first pull-down driving unit 130_11F. Therefore, as the driving capability is controlled as described above, the ripple occurring in the levels of the boosted voltage VPP and the reduced voltage VBB during the first section of the transition section may decrease greatly.

The first path coupling unit 130_11E selectively couples and decouples the second pull-up driving unit 130_11D with/from the output terminal VOUT0 so that the second pull-up driving unit 130_11D may supply the power supply voltage VDD to the output terminal VOUT0 during the first section of the transition section.

The second path coupling unit 130_11H selectively couples and decouples the second pull-down driving unit 130_11G with/from the output terminal VOUT0 so that the second pull-down driving unit 130_11G may supply the ground voltage VSS to the output terminal VOUT0 during the first section of the transition section.

Referring back to FIG. 1, the pixel array 140 includes a plurality of pixels 140_1_1 to 140_m_n arranged in rows and columns. The pixel array 140 is controlled on a basis of rows 140_1 to 140_m by the row control block 130. In other words, pixels 140_#_1 to 140_#_n included in one of the rows 140_1 to 140_m share a corresponding transmission signal TX#, a corresponding reset signal RX#, and a corresponding selection signal SX#. For example, pixels 140_1_1 to 140_1_n included in a first row 140_1 share a first transmission signal TX0, a first reset signal RX0 and a first selection signal SX0, and output first to $n^{th}$ pixel signals PX0 to PXn−1 simultaneously in response to the first transmission signal TX0, the first reset signal RX0 and the first selection signal SX0. For a better understanding of the embodiment of the present invention, the internal structure of the pixel is described below. For a simple description, one pixel 140_1_1 is described below representatively because the pixels 140_1_1 to 140_m_n have the same structure.

Figure 4:
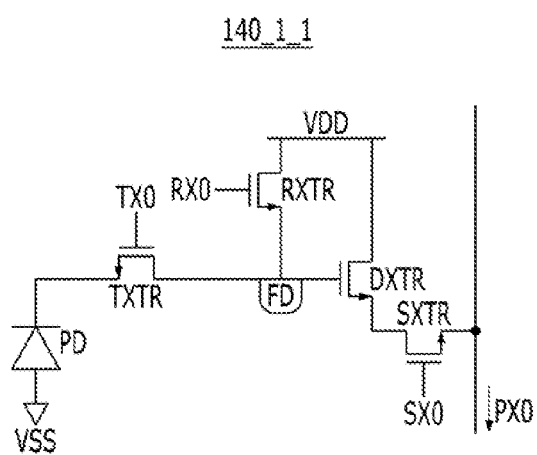
FIG. 4 illustrates an internal structure of a pixel shown in FIG. 1.

FIG. 4 illustrates the internal structure of the pixel 140_1_1.

Referring to FIG. 4, the pixel 140_1_1 has a general 4-transistor structure and may include a photodiode PD, a transmission transistor TXTR, a reset transistor RXTR, an amplification transistor DXTR, and a selection transistor SXTR. The transmission transistor TXTR is controlled based on the first transmission signal TX0, and the reset transistor RXTR is controlled based on the first reset signal RX0, and the selection transistor SXTR is controlled based on the first selection signal SX0. Since the photodiode PD, the transmission transistor TXTR, the reset transistor RXTR, the amplification transistor DXTR and the selection transistor SXTR do not form the basis of the present invention, a detailed description on these units has been omitted.

Figure 5:
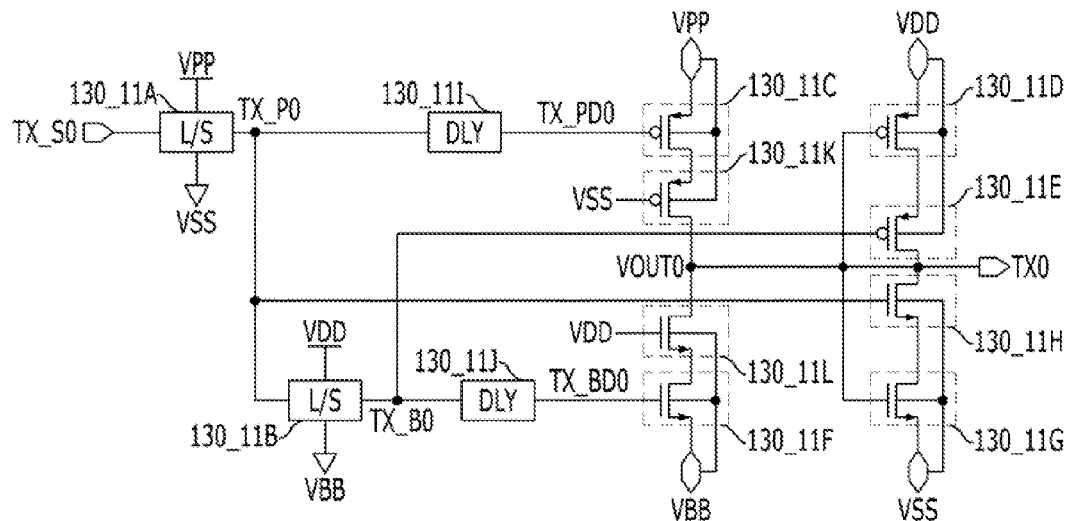
FIG. 5 illustrates another example of an internal structure of a first transmission driver shown in FIG. 2.
Figure 6:
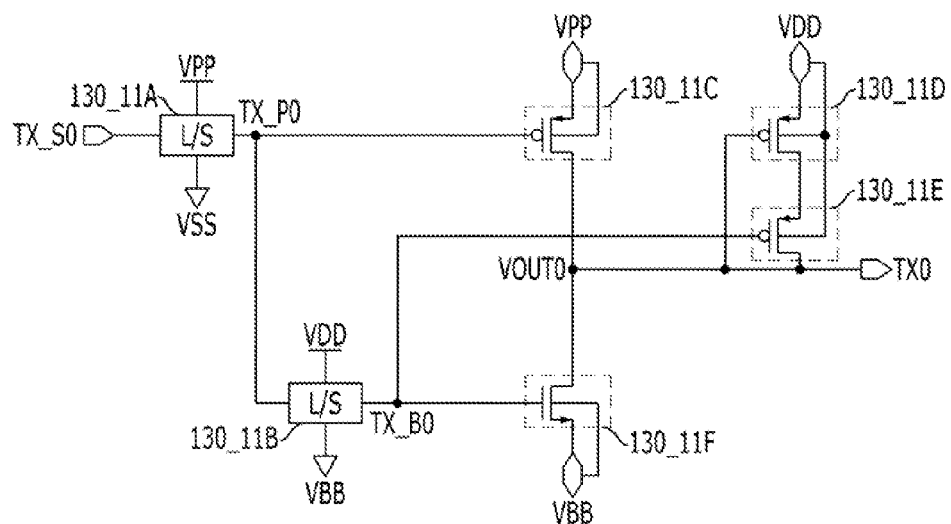
FIG. 6 illustrates another example of an internal structure of a first transmission driver shown in FIG. 2.
Figure 7:
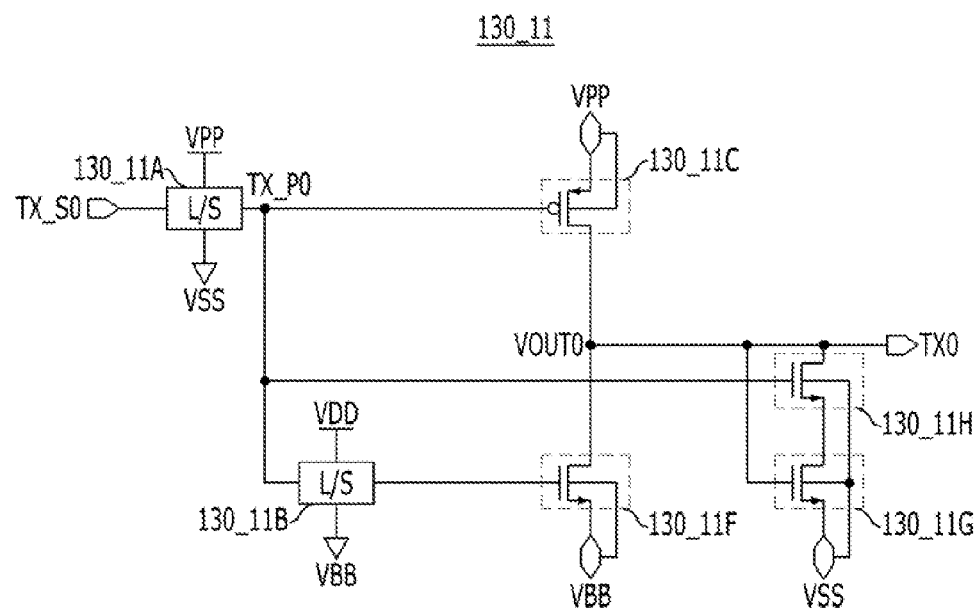
FIG. 7 illustrates another example of an internal structure of a first transmission driver shown in FIG. 2.

FIGS. 5 to 7 illustrate other examples of the internal structure of the first transmission driver 130_11 shown in FIG. 2. For a simple description, the same components shown in FIGS. 5 to 7 and in FIG. 3 are represented by the same reference numerals.

Referring to FIG. 5, the first transmission driver 130_11 may further include a first delay unit 130_11I, a second delay unit 130_11J, a first voltage limit unit 130_11K and a second voltage limit unit 130_11L in comparison with FIG. 3. The first delay unit 130_11I, the second delay unit 130_11J, the first voltage limit unit 130_11K and the second voltage limit unit 130_11L may be the components that may improve the performance of the first transmission driver 130_11 in accordance with the embodiment of the present invention.

The first delay unit 130_11I generates a first transmission pull-up delay signal TX_PD0 by delaying the first transmission pull-up signal TX_P0 and outputs the first transmission pull-up delay signal TX_PD0 to the first pull-up driving unit 130_11C. This is to control the first pull-up driving unit 130_11C to be turned on later than the second pull-up driving unit 130_11D when the first transmission source signal TX_S0 transitions from a power supply voltage VDD level to a ground voltage VSS level. In other words, the first delay unit 130_11I separates operation sections of the first and second pull-up driving units 130_11C and 130_11D so that the first and second pull-up driving units 130_11C and 130_11D are turned on step by step. Therefore, the second pull up driving unit 130_11D is turned on during a first section of a first transition section where the first transmission source signal TX_S0 transitions from the power supply voltage VDD level to the ground voltage VSS level, and the first pull-up driving unit 130_11C is turned on during a second section of the first transition section.

The second delay unit 130_11J generates a first transmission pull-down delay signal TX_BD0 by delaying the first transmission pull-down signal TX_B0 and outputs the first transmission pull-down delay signal TX_BD0 to the first pull-down driving unit 130_11F. This is to control the first pull-down driving unit 130_11F to be turned on later than the second pull-down driving unit 130_11G when the first transmission source signal TX_S0 transitions from the ground voltage VSS level to the power source voltage VDD level. In other words, the second delay unit 130_11 J separates operation sections of the first and second pull-down driving units 130_11F and 130_11G so that the first and second pull-down driving units 130_11F and 130_11G are turned on step by step. Therefore, the second pull-down driving unit 130_11G is turned on during a first section of a second transition section where the first transmission source signal TX_S0 transitions from the ground voltage VSS level to the power supply voltage VDD level, and the first pull-down driving unit 130_11F is turned on during the second section of the second transition section.

The first voltage limit unit 130_11K is coupled between the first pull-up driving unit 130_11C and the output terminal VOUT0 and limits the voltage difference between both terminals of the first pull-up driving unit 130_11C in response to the ground voltage VSS. This is in order to secure the operation reliability of the first pull-up driving unit 130_11C by limiting the voltage swing range of the first pull-up driving unit 130_11C. For example, the first voltage limit unit 130_11K may include a PMOS transistor where the ground voltage VSS is inputted to its gate, and its source and drain are coupled between the first pull-up driving unit 130_11C and the output terminal VOUT0.

The second voltage limit unit 130_11L is coupled between the first pull-down driving unit 130_11F and the output terminal VOUT0 and limits the voltage difference between both terminals of the first pull-down driving unit 130_11F in response to the power supply voltage VDD. This is to secure the operation reliability of the first pull-down driving unit 130_11F by limiting the voltage swing range of the first pull-down driving unit 130_11F. For example, the second voltage limit unit 130_11L may include an NMOS transistor where the power supply voltage VDD is inputted to its gate, and its source and drain are coupled between the first pull-down driving unit 130_11F and the output terminal VOUT0.

Referring to FIG. 6, the first transmission driver 130_11 does not include the second pull-down driving unit 130_11G and the second path coupling unit 130_11H shown in FIG. 3. In other words, the first transmission driver 130_11 may be designed to decrease a ripple occurring in the level of the boosted voltage VPP as including the second pull-up driving unit 130_11D and the first path coupling unit 130_11E.

Referring to FIG. 7, the first transmission driver 130_11 does not include the second pull-up driving unit 130_11D and the first path coupling unit 130_11E shown in FIG. 3. In other words, the first transmission driver 130_11 may be designed to decrease a ripple occurring in the level of the reduced voltage VBB as including the second pull-down driving unit 130_11G and the second path coupling unit 130_11H.

Hereafter, an operation of the image sensing device having the structure as described above in accordance with an embodiment of the present invention is described.

The first voltage generation circuit 110 generates a boosted voltage VPP based on a power supply voltage VDD, and the second voltage generation circuit 120 generates a reduced voltage VBB based on a ground voltage VSS.

Under this condition, the row control block 130 generates the first to $m^{th}$ transmission signals TX0 to TXm−1 corresponding to the first to $m^{th}$ transmission source signals TX_S0 to TX_Sm−1, the first to $m^{th}$ reset signals RX0 to RXm−1 corresponding to the first to $m^{th}$ reset source signals RX_S0 to RX_Sm−1, and the first to $m^{th}$ selection signals SX0 to SXm−1 corresponding to the first to $m^{th}$ selection source signals SX_S0 to SX_Sm−1 based on the power supply voltage VDD, the boosted voltage VPP, the ground voltage VSS and the reduced voltage VBB. For example, the first driving circuit 130_1 generates the first transmission signal TX0, the first reset signal RX0 and the first selection signal SX0 which swing between the reduced voltage VBB and the boosted voltage VPP by converting levels of the first transmission source signal TX_S0, the first reset source signal RX_S0 and the first selection source signal SX_S0, which swing between the ground voltage VSS and the power supply voltage VDD. Since the pixels 140_1_1 to 140_1_n included in the first row 140_1 share the first transmission signal TX0, the first reset signal RX0 and the first selection signal SX0, the capacitive load increases on signal lines for transmitting the signals TX0, RX0 and SX0. Since the current load increases in the first and second voltage generation circuits 110 and 120, a ripple occurs in the levels of the boosted voltage VPP and the reduced voltage VBB when the signals TX0, RX0 and SX0 transition. As a result, electric coupling occurs in a floating diffusion region FD of the pixels 140_1_1 to 140_1_n, and consequently, a row-wise temporal noise occurs in the image sensing device 100.

Therefore, the first driving circuit 130_1 in accordance with an embodiment of the present invention selectively uses the ground voltage VSS, the reduced voltage VBB, the power supply voltage VDD and the boosted voltage VPP when generating the first transmission signal TX0, the first reset signal RX0 and the first selection signal SX0. This is described in detail below with reference to FIG. 8, and for a simple description, an operation of the first transmission driver 130_11 shown in FIG. 3 is representatively described below.

Figure 8:
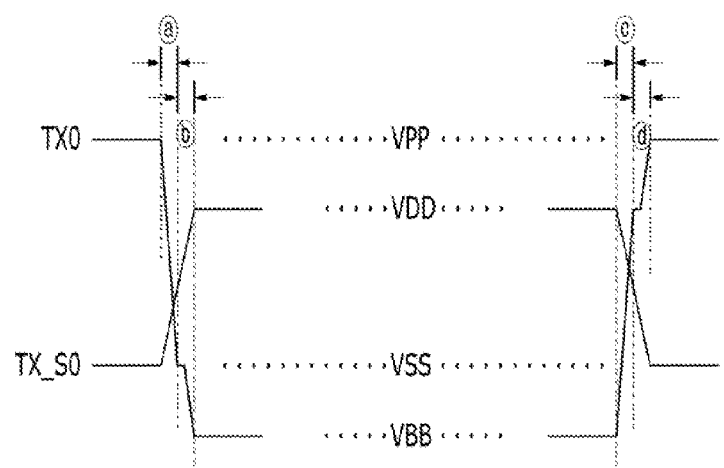
FIG. 8 is a timing diagram illustrating an operation of a first transmission driver shown in FIG. 2.

FIG. 8 is a timing diagram illustrating an operation of the first transmission driver 130_11.

Referring to FIG. 8, the first transmission driver 130_11 drives the first transmission signal TX0 based on the ground voltage VSS and the reduced voltage VBB during a first section A of a second transition section where the first transmission source signal TX_S0 transitions from the ground voltage VSS to the power supply voltage VDD, and it drives the first transmission signal TX0 based on the reduced voltage VBB during the second section B of the second transition section.

To be specific, the first and second pull-down driving units 130_11F and 130_11G are turned on simultaneously during the first section A of the second transition section. In other words, the first pull-down driving unit 130_11F drives the output terminal VOUT0 with the reduced voltage VBB during the first section A, and the second pull-down driving unit 130_11G drives the output terminal VOUT0 with the ground voltage VSS during the first section A. As the first and second pull-down driving units 130_11F and 130_11G sink the current simultaneously during the first section A of the second transition section, the current load is spread on the reduced voltage VBB terminal and the ground voltage VSS terminal. When the threshold voltage of the second pull-down driving unit 130_11G is designed to be lower than the threshold voltage of the first pull-down driving unit 130_11F, the current load of the reduced voltage VBB terminal may greatly decrease. Meanwhile, during the second section B of the second transition section, the first pull-down driving unit 130_11F is turned on, and the second pull-down driving unit 130_11G is turned off. In other words, the first pull-down driving unit 130_11F only drives the output terminal VOUT0 with the reduced voltage VBB during the second section B.

Continuously, the first transmission driver 130_11 drives the first transmission signal TX0 based on the power supply voltage VDD and the boosted voltage VPP during a first section C of a first transition section where the first transmission source signal TX_S0 transitions from the power supply voltage VDD to the ground voltage VSS, and it drives the first transmission signal TX0 based on the power supply voltage VDD during the second section D of the first transition section.

To be specific, the first and second pull-up driving units 130_11C and 130_11D are turned on simultaneously during the first section C of the first transition section. In other words the first pull-up driving unit 130_11C drives the output terminal VOUT0 with the boosted voltage VPP during the first section C, and the second pull-up driving unit 130_11D drives the output terminal VOUT0 with the power supply voltage VDD during the first section C. As the first and second pull-up driving units 130_11C and 130_11C source the current simultaneously during the first section C of the first transition section, the current load is spread on the boosted voltage VPP terminal and the power source voltage VDD terminal. When the threshold voltage of the second pull-up driving unit 130_11D is designed to be lower than the threshold voltage of the first pull-up driving unit 130_11C, the current load of the boosted voltage VPP terminal may greatly decrease. Meanwhile, during the second section D of the first transition section, the first pull-up driving unit 130_11C is turned on, and the second pull-up driving unit 130_11D is turned off. In other words, the first pull-up driving unit 130_11C only drives the output terminal VOUT0 with the boosted voltage VPP during the second section D.

In accordance with the embodiments of the present invention, the image sensing device may reduce row-wise temporal noise by decreasing the ripple occurring in levels of the boosted voltage VPP and the reduced voltage VBB when a transmission signal, a reset signal and a selection signal are generated.

While the present invention has been described with respect to the specific embodiments, it should be noted that the embodiments are for describing, not limiting, the present invention. Further, it should be noted that the present invention may be achieved in various ways through substitution, change, and modification, by those skilled in the art without departing from the scope of the present invention as defined by the following claims.

For example, although a pixel of a 4-transistor structure is described in the embodiments of the present invention, the inventive concept is not limited to this and another transistor structure is possible in accordance with this invention, e.g., 1-transistor structure, 3-transistor structure, 5-transistor structure, and so on. As another example, pixel driving signals, e.g., a transmission signal, a reset signal, a selection signal, and so on, are generated to correspond to the structure of the pixel and may be altered accordingly.

Although the driver is applied to an image sensing device in the embodiments of the present invention, this is not a limitation and should be obvious that the driver may be applied to other fields such as a semiconductor memory device.

What is claimed is:

1. A driver, comprising:
    a first level shifting unit suitable for generating a second signal which swings in a second threshold range in response to a first signal which swings in a first threshold range;
    a second level shifting unit suitable for generating a third signal which swings in a third threshold range in response to the second signal; and
    a driving unit suitable for generating a fourth signal swinging in a fourth threshold range and outputted through an output terminal in response to the second and third signals,
    wherein the driving unit comprises:
        a first pull-up driving unit suitable for driving the output terminal with a first high voltage in response to the second signal;
        a first pull-down driving unit suitable for driving the output terminal with a first low voltage in response to the third signal;
        a second pull-down driving unit suitable for driving the output terminal with a second low voltage which is higher than the first low voltage in response to the fourth signal; and
        a first path coupling unit suitable for coupling the second pull-down driving unit with the output terminal in response to the second signal.

2. The driver of claim 1, wherein a threshold voltage of the second pull-down driving unit is lower than a threshold voltage of the first pull-down driving unit.

3. The driver of claim 1, wherein the first low voltage includes a negative voltage (VBB), and the second low voltage includes a ground voltage (VSS).

4. The driver of claim 1, further comprising:
    a first delay unit coupled between the second level shifting unit and the first pull-down driving unit, and suitable for delaying the third signal and outputting a delayed signal to the first pull-down driving unit as the third signal.

5. The driver of claim further comprising:
    a second pull-up driving unit suitable for driving the output terminal with a second high voltage which is lower than the first high voltage in response to the fourth signal; and
    a second path coupling unit suitable for coupling the second pull-up driving unit with the output terminal in response to the third signal.

6. The driver of claim 5, wherein a threshold voltage of the second pull-up driving unit is lower than a threshold voltage of the first pull-up driving unit.

7. The driver of claim 5, wherein the first high voltage includes a boosted voltage (VPP), and the second high voltage includes a power supply voltage (VDD).

8. The driver of claim 5, further comprising:
    a second delay unit coupled between the first level shifting unit and the first pull-up driving unit, and suitable for delaying the second signal and outputting a delayed signal to the first pull-up driving unit as the second signal.

9. The driver of claim 1, wherein the first threshold range includes a range between a ground voltage (VSS) level and a power supply voltage (VDD) level, and the second threshold range includes a range between the ground voltage (VSS) level and a boosted voltage (VPP) level, and the third threshold range includes a range between a negative voltage (VBB) level and the power supply voltage (VDD) level, and the fourth threshold range includes a range between the negative voltage (VBB) level and the boosted voltage (VPP) level.

10. The driver of claim 1, further comprising:
    a first voltage limit unit coupled between the first pull-up driving unit and the output terminal and suitable for limiting a voltage difference between both terminals of the first pull-up driving unit in response to a first control signal; and a second voltage limit unit coupled between the first pull-down driving unit and the output terminal and suitable for limiting a voltage difference between both terminals of the first pull-down driving unit in response to a second control signal.

11. The driver of claim 10, wherein the first control signal includes a signal having a ground voltage (VSS) level, and the second control signal includes a signal having a power supply voltage (VDD) level.

12. A driver, comprising:
a first level shifting unit suitable for generating a second signal which swings in a second threshold range in response to a first signal which swings in a first threshold range;
a second level shifting unit suitable for generating a third signal which swings in a third threshold range in response to the second signal; and
a driving unit suitable for generating a fourth signal swinging in a fourth threshold range and outputted through an output terminal in response to the second and third signals,
wherein the driving unit comprises:
a first pull-up driving unit suitable for driving the output terminal with a first high voltage in response to the second signal;
a pull-down driving unit suitable for driving the output terminal with a first low voltage in response to the third signal;
a second pull-up driving unit suitable for driving the output terminal with a second high voltage which is lower than the first high voltage in response to the fourth signal; and a path coupling unit suitable for coupling the second pull-up driving unit with the output terminal in response to the third signal.

13. The driver of claim 12, wherein a threshold voltage of the second pull-up driving unit is lower than a threshold voltage of the first pull-up driving unit.

14. A driver, comprising:
a first pull-up driving unit suitable for generating a second signal by driving an output terminal with a first high voltage during a first transition section where a first signal shifts from a first logic level to a second logic level;
a first pull-down driving unit suitable for generating the second signal by driving the output terminal with a first low voltage during a second transition section where the first signal shifts from the second logic level to the first logic level;
a second pull-up driving unit suitable for driving the output terminal with a second high voltage which is lower than the first high voltage during a first section of the first transition section;
a second pull-down driving unit suitable for driving the output terminal with a second low voltage which is higher than the first low voltage during a first section of the second transition section;
a first path coupling unit suitable for coupling the second pull-up driving unit with the output terminal in response to the first signal; and
a second path coupling unit suitable for coupling the second pull-down driving unit with the output terminal in response to the first signal.

* * * * *